United States Patent [19]
Buchholz et al.

[11] 4,277,264
[45] Jul. 7, 1981

[54] FILTER CLEANING ARRANGEMENT

[75] Inventors: Kenneth M. Buchholz, Shorewood, Wis.; Henry T. Le Maire, Prairie View, Ill.

[73] Assignee: Schomann, Inc., Milwaukee, Wis.

[21] Appl. No.: 107,343

[22] Filed: Dec. 26, 1979

[51] Int. Cl.³ .............................................. B01D 46/04
[52] U.S. Cl. ....................................... 55/294; 55/283; 55/302; 55/385 A; 55/500; 55/482; 55/DIG. 29
[58] Field of Search .................... 55/290, 293, 294, 96, 55/283, 302, 303, 385 A, 500, 482, DIG. 29

[56] References Cited

U.S. PATENT DOCUMENTS

| | | | |
|---|---|---|---|
| 364,099 | 5/1887 | Gerard | 55/291 |
| 2,516,680 | 7/1950 | Culpepper | 55/290 |
| 2,729,304 | 1/1956 | Swanson . | |
| 2,861,649 | 11/1958 | Junkmann . | |
| 3,147,098 | 9/1964 | Honan et al. | 55/294 |
| 3,166,391 | 1/1965 | Keser | 55/294 |
| 3,303,635 | 2/1967 | Sherrill . | |
| 3,306,012 | 2/1967 | Wallin | 55/294 |
| 3,345,805 | 10/1967 | Sherrill . | |
| 3,482,378 | 12/1969 | Noland | 55/283 |
| 3,894,854 | 7/1975 | Wolfe . | |
| 3,936,902 | 2/1976 | Shackleton et al. . | |
| 4,036,613 | 7/1977 | Brown et al. . | |
| 4,045,194 | 8/1977 | Ferri | 55/294 |
| 4,046,526 | 9/1977 | Phillippi . | |
| 4,077,781 | 3/1978 | Sundstrom . | |
| 4,203,138 | 5/1980 | Kerman | 55/294 |

FOREIGN PATENT DOCUMENTS

| | | | |
|---|---|---|---|
| 783349 | 8/1943 | Fed. Rep. of Germany | 55/294 |
| 1017890 | 10/1957 | Fed. Rep. of Germany | 55/294 |
| 1909549 | 9/1970 | Fed. Rep. of Germany | 55/302 |

OTHER PUBLICATIONS

Cambridge–Micretain, Series Absolute Filters Bulletin 142K–Cambridge Filter Corp., P.O. Box 1215, Syracuse, New York.

Air Polution Control–Sly Corp. Bulletin No. 204B, pp. 1–35, 4/79–Sly Mfg. Co., Strongsville, Ohio.

*Primary Examiner*—Bernard Nozick
*Attorney, Agent, or Firm*—Quarles & Brady

[57] ABSTRACT

A cleaning arrangement for a pleated filter includes opposite blower and suction heads parallel to the pleats that move in tandem to effect cleaning. In the preferred embodiment, the heads have air slots that are effectively as wide as a single pleat, the blower slot extends substantially across the entire filter, and the suction slot has two sections that each extend halfway across the filter with the sections being respectively operative as the heads move back and forth.

1 Claim, 8 Drawing Figures

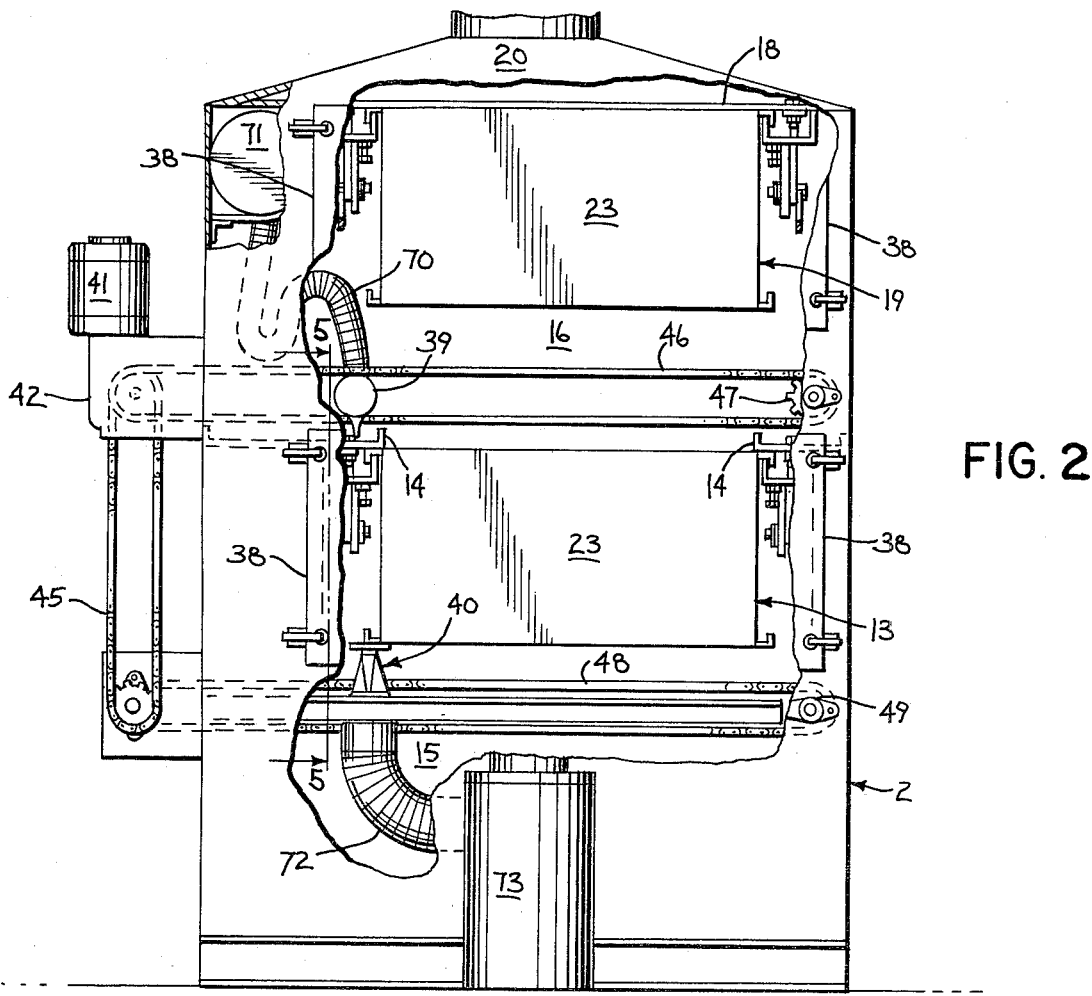
FIG. 2
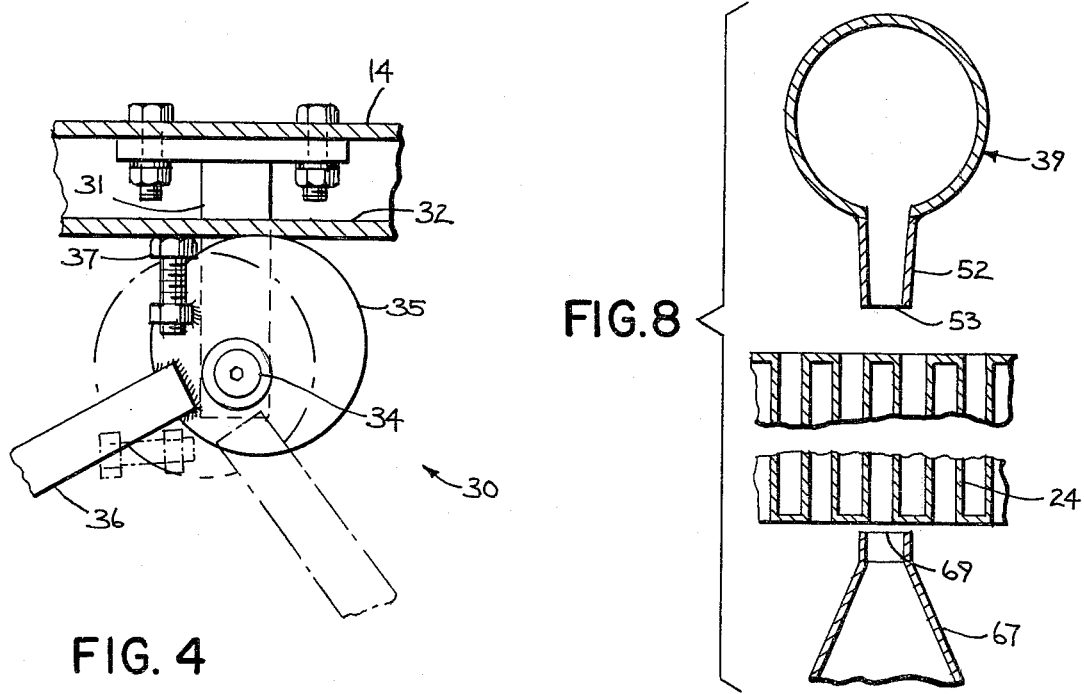
FIG. 4
FIG. 8

FILTER CLEANING ARRANGEMENT

BACKGROUND OF THE INVENTION

This invention relates to a filter cleaning arrangement particularly, but not only, suited for high efficiency particulate air ("HEPA") filters.

HEPA filters include a fiberglass paper medium arranged in relatively deep, narrow pleats separated by corrugated support members. Such filters are extremely efficient, and have been used extensively in sophisticated applications such as nuclear plants. They are, however, coming into increasing use in more conventional industrial applications such as in connection with chipping, grinding or cutting operations where it is desired to remove particulates from air in order to meet EPA and OSHA standards. Conventional baghouse systems do not filter effectively enough to meet such standards, and as a result the filtered air cannot be recirculated in the plant and must be exhausted outside. This can result in substantial energy losses since the exhausted air must be replaced and heated or cooled to meet desired plant conditions, and it can also result in undesirable external emissions of particulate material.

HEPA filters must be cleaned or replaced like other filters, but they are relatively expensive so that frequent replacement is simply not financially feasible, particularly in conventional industrial applications. Conventional cleaning arrangements involve either blowing air through the filter from its outlet side or drawing air through it from its inlet side. Blowing air into a pleated filter is inefficient since this merely scatters the dust particles causing them to be entrapped in some other portion of the filter medium. On the other hand, using only a suction device creates a very localized cleaning force which is ineffective to clean into the depths of the filter pleats. Therefore, neither blower nor suction devices alone are capable of developing uniform pressure differentials for cleaning, particularly in a deeply pleated filter. As a result, it is necessary to use very large and expensive blower or suction units that can at some points create pressure differentials large enough to cause physical damage to the filter medium.

SUMMARY OF THE INVENTION

The filter cleaning arrangement of this invention utilizes both blower and suction heads, disposed on opposite sides of the filter and operating in tandem. There are very surprising results in that relatively small blower and suction units, with a total cost substantially less than that of a single larger unit, provide more effective cleaning action while minimizing the likelihood of physical damage to the filter medium. It is believed that the more effective cleaning action results from more uniform pressure differentials across the depth of the filter and a more direct air flow caused by the air being blown in on one side and drawn out at the other along an essentially straight line. Using smaller units also minimizes disruption of the main stream of air flow through the filter when cleaning is accomplished during continuous filtering operations.

The basic concept is applicable to a variety of filters, but the invention also contemplates a specific arrangement particularly suited for pleated HEPA filters. In the preferred embodiment, the blower and suction heads have slots that extend across the entire filter and are wide enough to span at least a single pleat, thus maximizing cleaning efficiency. Further, the suction slot is divided into two sections, each extending halfway across the filter, one being operative while the heads are moving in one direction and the other being operative during a return movement. This provides the desired effective cleaning action, and further reduces suction requirements, and therefore costs.

In general, the invention provides an extremely efficient filter cleaning arrangement that can operate while the overall unit in which it is placed is in operation, and that is relatively simple, inexpensive and easy to assemble, operate and maintain. Other objects and advantages will appear from the description to follow.

BRIEF DESCRIPTION OF THE DRAWINGS

FIG. 2 is a rear view in elevation, partially broken away, of the bench shown in FIG. 1;

FIG. 4 is a fragmentary side view of the locking mechanism taken through the plane of the line 4—4 shown in FIG. 3;

FIG. 8 is an enlarged fragmentary side view in cross section, partially broken away, taken through the plane of the line 8—8 shown in FIG. 5.

DESCRIPTION OF THE PREFERRED EMBODIMENT

Figure 1:
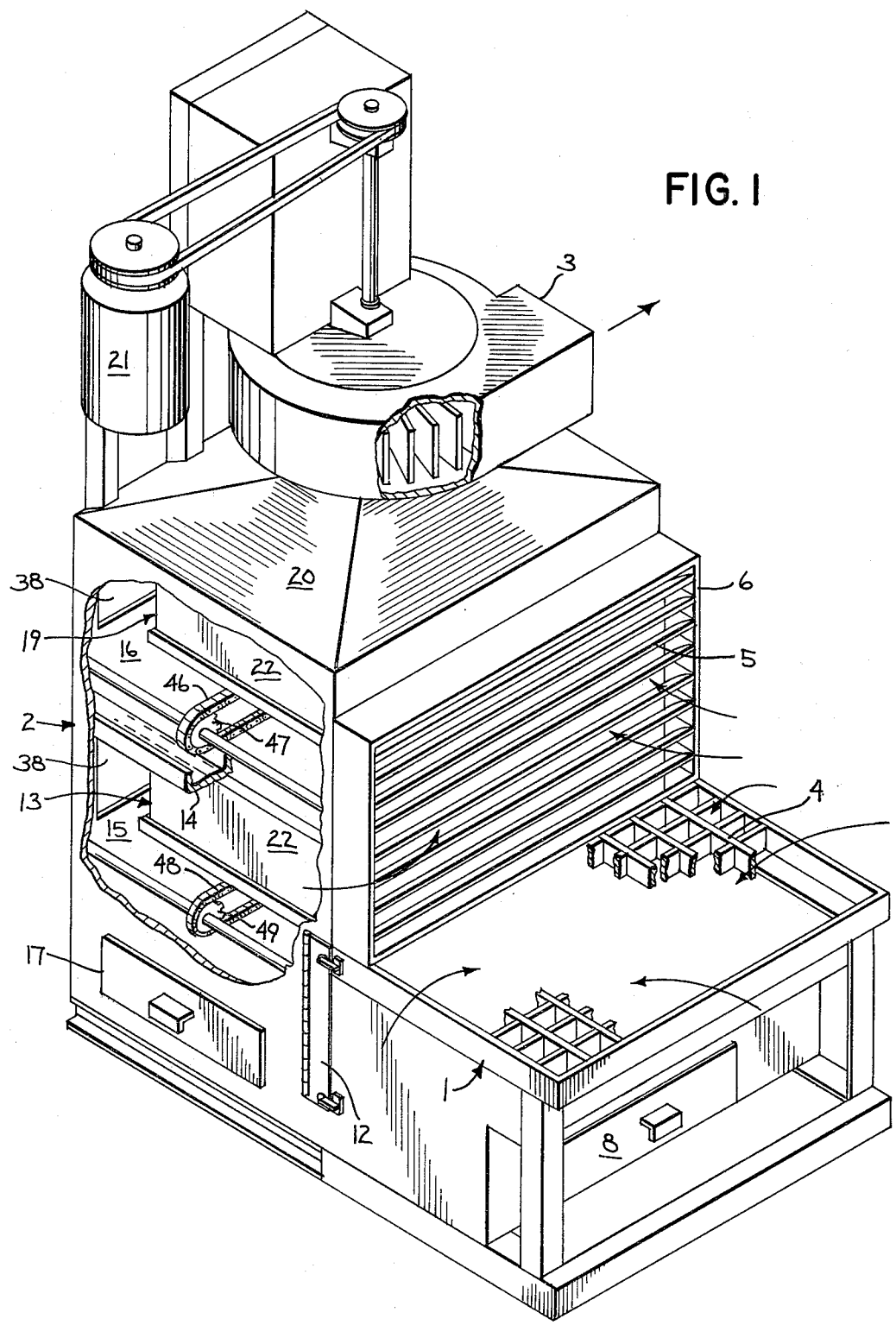
FIG. 1 is a view in perspective, partially broken away, showing a grinding bench including a filter cleaning arrangement constituting a preferred embodiment of the invention.

The grinding bench shown in FIG. 1 includes a bench portion 1, a rear filter housing portion 2, and a system exhaust fan 3 mounted on the housing 2. The bench portion 1 includes a work surface 4 comprising an open steel grating designed for relatively heavy loads and arranged at a convenient work height. Louvers 5 mounted in a frame 6 extending vertically from the rear edge of the bench portion 1 define an inlet to a rear compartment 7, seen in FIG. 7, that leads to the area beneath the work surface 4. As seen by the arrows in FIG. 1, the exhaust fan 3 draws air through the work surface 4 and the louvers 5, after which it moves through the filter housing unit 2, as will be described, and is exhausted at the fan 3. It is a particular advantage of this invention that the filtered air can be exhausted directly into the work area as opposed to having to be vented to the outside.

In the preferred embodiment, capacity of the exhaust fan 3 is approximately 1500–2000 cfm. This flow is not sufficient to entrain large particles developed during grinding or similar operations, and such particles will simply fall to the floor below the work surface 4. A clean out drawer 8 is provided to allow such particles to be removed periodically. As shown by the arrows in FIG. 7, air containing the remaining particulate materials then passes through a conventional pre-filter 9, which may be of any suitable type such as a disposable metallic viscous filter, mounted across an opening 10 that extends substantially entirely across a wall 11 that separates the bench portion 1 from the housing portion 2. The pre-filter 9 can be removed for cleaning or replacement through the side of the housing 2 by means of an access panel 12, seen in FIG. 1. The pre-filter 9 is designed to filter out intermediate sized particles for which a high efficiency filter medium is not needed.

Referring to FIGS. 1 and 2, a primary filter module 13, of box-like overall configuration, and a perimetral wall 14 that defines a large opening covered by the filter 13, together divide the housing 2 into a lower dust chamber 15 and an upper clean air chamber 16. A clean out drawer 17 is provided for the chamber 15. A wall 18 at the top of the chamber 16 defines an opening covered by a secondary filter module 19, which is like the module 13 but serves essentially only as a backup as will be described, and a manifold roof 20 leads to the exhaust fan 3. The exhaust fan 3 may be of any suitable construction, and in the preferred embodiment is driven by an electric motor 21 and a conventional belt and pulley arrangement.

Figure 6:
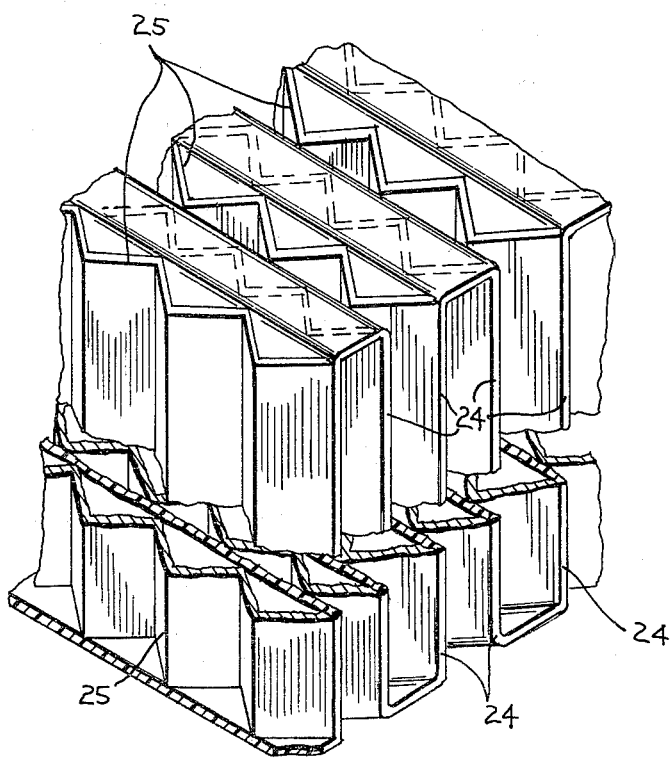
FIG. 6 is an enlarged fragmentary view, partially broken away, showing the interior structure of a filter module of the bench shown in FIG. 1.

As indicated, the filter modules 13 and 19 are essentially identical, and each includes a sheet metal casing defining side walls 22 and longer front and rear walls 23. Referring to FIG. 6, the filter medium proper is a fiberglass paper material 24 arranged to define a series of relatively narrow, relatively closely spaced pleats, with the individual pleats running from front to rear of the housing 2 and the pleats as a group being parallel to one another and extending from side to side. Corrugated metal spaces 25 are provided to maintain the pleat configuration while allowing air flow in a vertical direction. As previously indicated, such filters are well known to those skilled in the art, and are available from the Cambridge Filter Corporation of Syracuse, New York. They are rated as being capable to remove a minimum of 99.97 percent of all dust particles that are 0.3 microns or larger, and thus meet HEPA clean room filter specifications. The module 13 provides primary filtering and is the one that is cleaned by the arrangement to be described below. The module 19 serves as a backup to prevent emission of particulate materials should the module 13 rupture or otherwise become ineffective.

The filter modules 13 and 19 are removably mounted on the underside of the walls 14 and 18 in essentially the same manner, and can be mounted in any suitable fashion, and only the mounting of the primary module 13 will be described. As seen best in FIG. 3, the upper and lower edges of the walls 22 and 23 are turned to define laterally outwardly extending flanges 26 along their entire lengths, and the flanges 26 are further turned toward the center of the modules at 27 to define an L-shaped flange. The wall 14 is provided with upwardly turned flanges 28. A seal ring 29 of any suitable material is interposed between the upper surfaces of the flanges 26 and the under surface of the wall 14 about the entire periphery of the module 13.

Figure 3:
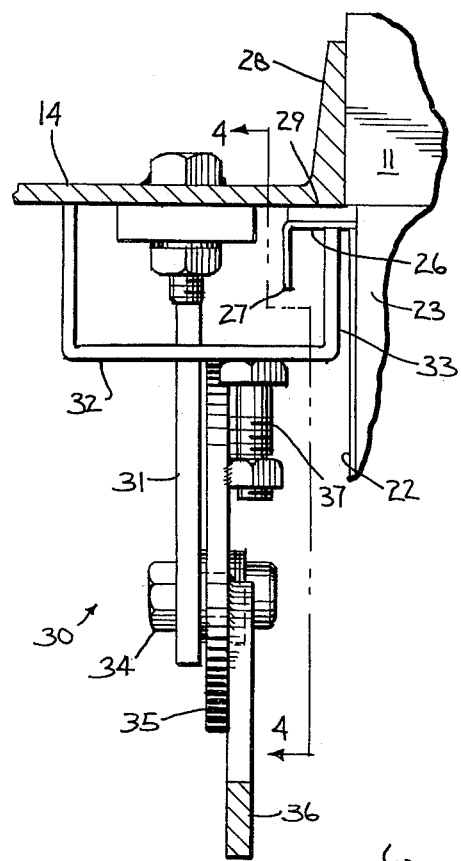
FIG. 3 is an enlarged fragmentary view in elevation showing a locking mechanism used to clamp a filter module in place in the bench of FIG. 1.

There is a locking mechanism 30 at each end of each of the modules 13, 19, and one of these, for the primary module 13, is shown in detail in FIGS. 3 and 4. Each locking mechanism 30 includes a generally T-shaped support bar 31 formed from flat stock and having its cross bar portion bolted to the underside of the associated wall 14 or 18. An upwardly opening channel member 32 extends substantially along the entire length of the side of the associated module and is slotted to be freely vertically slideable on the bar 31. The channel member 32 has an upwardly extending portion 33 aligned and engageable with the underside of the associated flange 26. A bolt 34 at the bottom end of the bar 31 pivotally mounts a circular eccentric cam 35, the periphery of which is engageable with the underside of the channel 32. The cam 35 is provided with an operating handle 36 and an abutment in the form of a bolt 37 that is also engageable with the underside of the channel 32.

In FIG. 4, the unlocked position of the locking mechanism 30 is shown in broken lines. In this position, the cam periphery and bolt 37 are more distantly spaced from the associated wall 14 or 18, as the result of which the channel 32 can slide downwardly providing clearance for the insertion or removal of the module 13 or 19, in both cases through access doors 38 in the rear wall of the housing 2. When the respective module is in place and the operating handle 36 is moved in a clockwise direction to the full line position shown in FIG. 3, however, both the cam periphery and bolt 37 move upwardly against the channel 32 to cause it to engage the flange 26 and thus clamp the module against the underside of the associated wall. As can be seen in FIG. 4, when in locked position the bolt 37 and the portion of the cam periphery engaging the underside of the channel 32 are on opposite sides of the pivot bolt 34, providing an over-center action so that the module will remain in place until the cam 35 is rotated counterclockwise using the handle 36.

Figure 7:
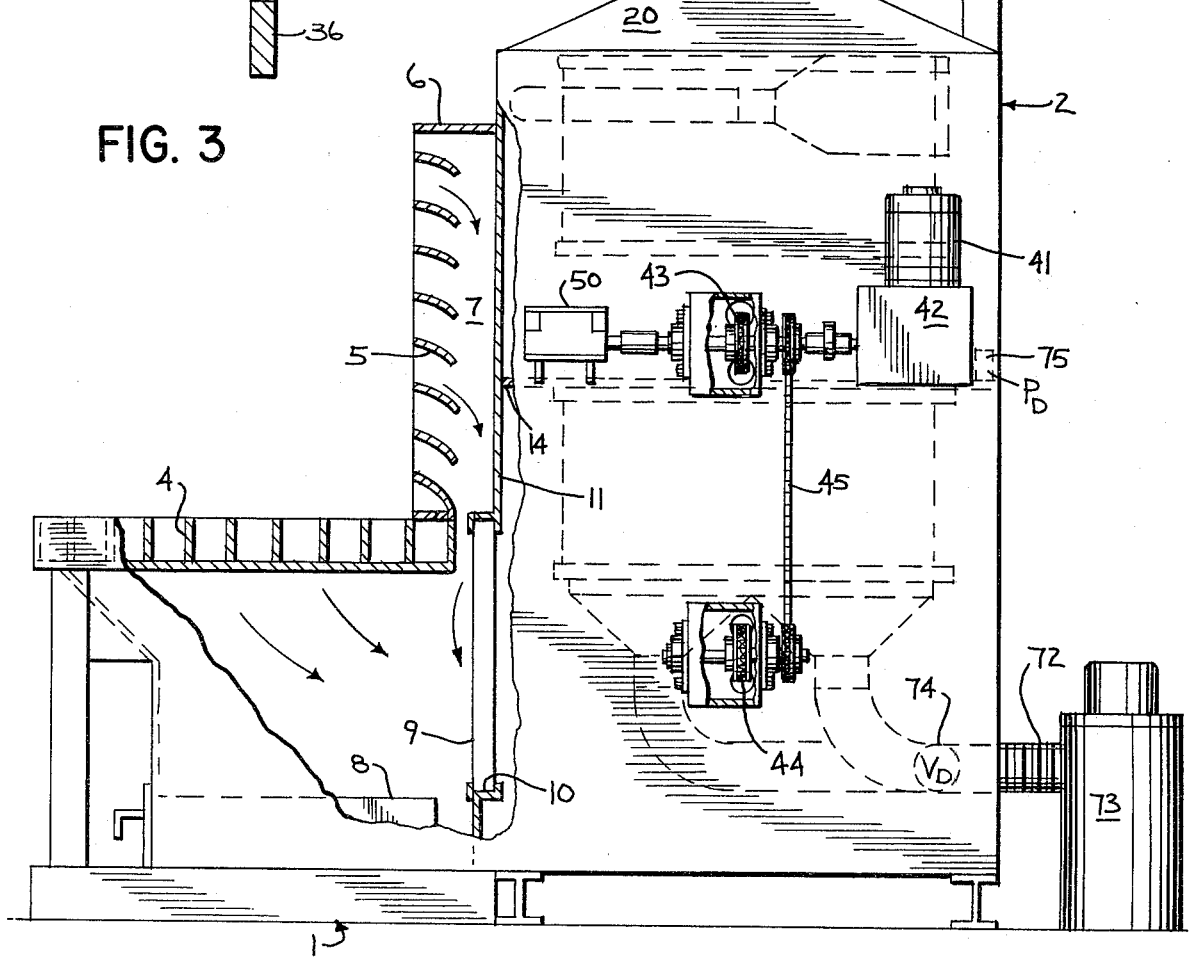
FIG. 7 is a side view in elevation, partially broken away, with certain elements being shown schematically, of the bench of FIG. 1.

The filter cleaning arrangement of the invention includes a blower head designated generally by the reference numeral 39 and a suction head designated generally by the reference numeral 40, both driven by a reversible electric drive motor 41 operating through a speed reducer 42 which are located outside the housing 2 as shown in FIGS. 2 and 7. The output shaft of the speed reducer 42 is in line with and drives an upper blower drive sprocket 43, and a lower, suction drive sprocket 44 is driven through an intermediate chain 45, both drive sprockets also being outside the housing 2. A blower drive chain 46 extends from the sprocket 43 across substantially the entire width of the housing 2 to an idler sprocket 47. The chain 46 is disposed above, or on the outlet side of the filter module 13, and transverse to the pleats of the module 13. A suction drive chain 48 similarly extends to a suction idler sprocket 49, but is below or on the inlet side of the module 13. The areas where the drive chains 46, 48 go through the housing wall are preferably enclosed as shown in FIG. 7 to keep the enclosure air tight. The output shaft of the speed reducer 42 is also aligned with and indirectly operates a rotary limit switch 50 for a purpose to be described.

Figure 5:
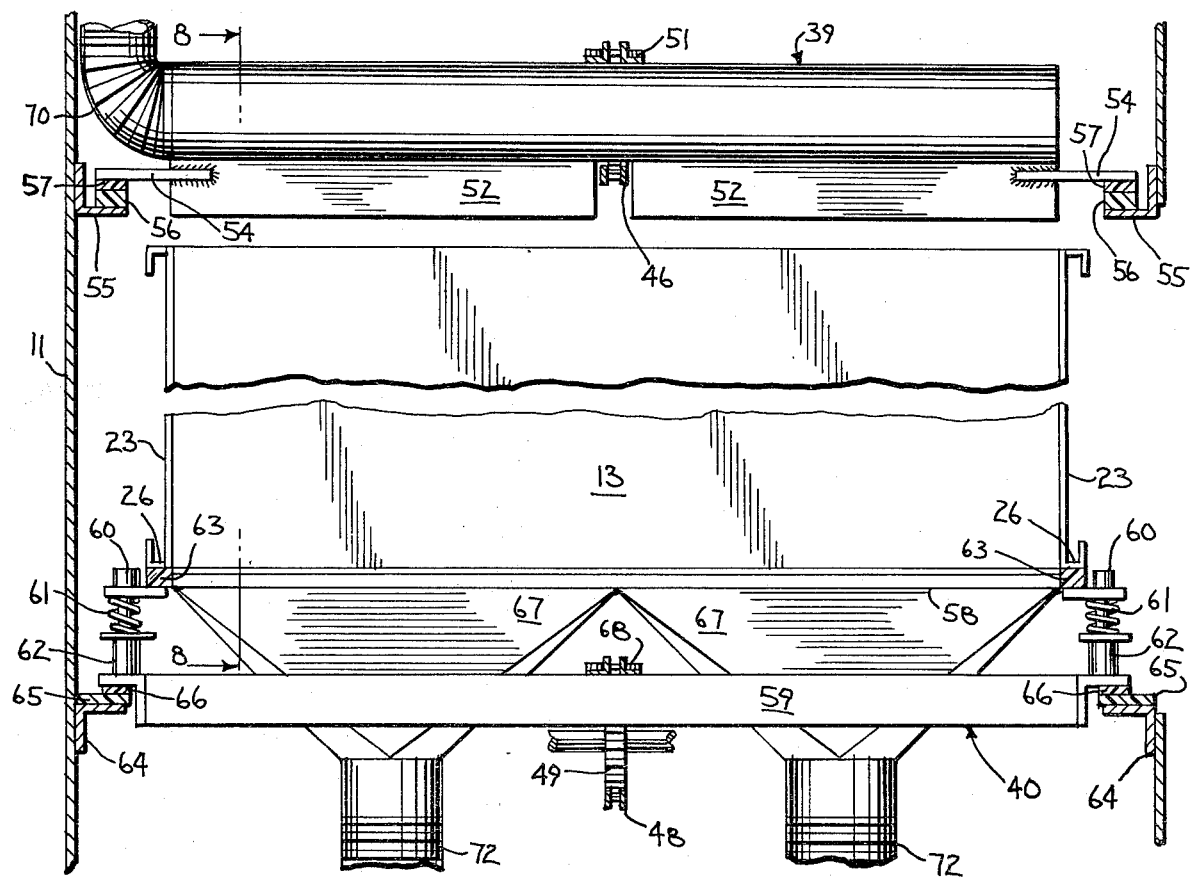
FIG. 5 is an enlarged fragmentary side view in cross section taken through the plane of the line 5—5 shown in FIG. 2 with certain parts removed for clarity.

The blower head 39 is essentially a hollow circular cylindrical tube disposed parallel to the pleats of the module 13 and transverse to the chain 46. As shown in FIG. 5, the chain 46 is connected to the head 39 at the top and middle of the latter by means of a pickup link 51. The blower head 39 has an axially extending bottom opening extending along its entire length, and a nozzle portion 52 which defines a blower slot 53 facing and closely spaced from the outlet side or top surface of the module 13. There are two nozzle portions 53 the inner ends of which are spaced apart to allow room for the chain 46, but the blower slot 53 can be considered from the operation standpoint to be a single continuous slot that runs across the entire module 13. As seen in FIG. 8, the blower slot 53 has a width which is approximately one and one-half times the width of a single pleat of the module 13. This width for the blower slot 53 ensures that air is blown over an entire pleat, and thus the slot width can effectively be considered approximately equal to the width of a single pleat.

Referring back to FIG. 5, lugs 54 are mounted on and extend outwardly from opposite sides of the head 39 to define a carriage that rides on L-shaped guides 55 fixed to the inner surfaces of the front and rear walls of the housing 2 and run essentially from one end of the module 13 to the other. The guides 55 are preferably provided along their entire lengths with strips 56 of ultra-high density polyethylene or some other material with natural lubricity and the lugs 54 are provided with blocks 57 of identical material so that the blower carriage can slide easily back and forth from one end of the module 13 to the other. The weight of the blower head 39, chain 46 and associated elements is such that the blower carriage will remain on the guides 55 and the nozzle portions 52 will remain at the desired close spacing with the top surface of the module 13.

The suction head 40 includes a carriage made up of an upper guide bar 58 and a lower guide bar 59 vertically spaced from one another, both extending across the module 13 from front to rear and being parallel to the pleats. The upper and lower bars 58, 59 are connected by means of headed pins 60 that have their lower ends fixed to the lower bar 59. The slightly downwardly offset ends of the upper bar 58 are provided with openings to allow the bar to move vertically along the pins 60 with the heads at the upper ends of the pins 60 limiting such movement. Compression springs 61 are disposed around the pins 60 between flanged collars 62 and the ends of the upper bar 58, the springs 62 serving to urge the bars apart in a vertical direction. The upper bar 58 rides along the underside of the flanges 26 at the lower edges of the module front and rear walls 23, and these are preferably provided with blocks 63 of polyethylene similar to the blocks 57. This lower bar 59 rides on L-shaped guides 64 similar to the guides 55, and these are preferably provided with lubricating strips 65 also similar to the strips 56. The ends of the lower bar 59 are provided with polyethylene blocks 66 similar to the blocks 57 so that the vacuum carriage can slide easily back and forth from one end of the module 13 to the other. The springs 61 keep the bars 58 and 59 respectively tight against the underside of the flanges 26 and the guides 64. A pair of separate vacuum nozzles 67 are fixed to the upper bar 58, and the lower bar 59 is connected to the suction drive chain 48 by means of a pickup link 68. As can be seen in FIG. 8, the suction nozzles 67 define suction slots 69 having a width approximately equal to the width of a single pleat, and as seen in FIG. 5, each nozzle constitutes a slot section that extends approximately halfway across the bottom surface or inlet side of the module 13. The slot sections are axially aligned to effectively provide a continuous suction slot 69 that runs across the entire module 13.

The blower head 39 is connected through a flexible hose 70 to a conventional blower 71 mounted in the chamber 16. The blower 71 draws air from within the chamber 16 and delivers it to the blower head 39, at the rate in the preferred embodiment of approximately 100 cfm. The suction nozzles 67 are connected through separate suction hoses 72 to a conventional vacuum device 73 in the chamber 15. The vacuum devide 73 in the preferred embodiment draws approximately 100 cfm. A diverter valve 74, shown schematically in FIG. 7, is provided to switch between the suction hoses 72, and only one of them is operating at any one time.

A pressure differential switch 75, shown schematically in FIG. 7, is provided to sense the pressure difference between the chambers 15 and 16. It thus senses the degree of clogging of the filter module 13, since the pressure differential will increase as the filter becomes more clogged and is thus unable to pass as much air. The switch 75, diverter valve 74 and limit switch 50 serve as control components. They may be of any of the various types well known to those skilled in the art, and connections between them will also be obvious to such persons without further description.

In normal operation when the module 13 is clean, the exhaust fan 3 will be operating, but the motor 41, blower 71 and vacuum device 73 will be inoperative and the blower head 39 and suction head 40 will be "parked" in the positions shown in FIG. 2, slightly beyond the left end of the module 13 as seen therein. When the pressure differential switch 75 senses that cleaning is required, it causes the motor 41, blower 71 and vacuum device 73 to be activated for a cleaning cycle, the exhaust fan 3 remaining active throughout the cycle. Actuation of the motor 41 will cause the blower head 39 and suction head 40 to move in tandem across the module 13, to the right as seen in FIG. 2, the trip to the other end of the module 13 taking approximately one minute in the preferred embodiment. The blower and suction slots defined by the heads 39 and 40 are in alignment and will pass over individual pleats together. During this time, the blower head 39 will be delivering air and the suction head 40 will be drawing air, the net result being a highly effective cleaning action. When the heads 39 and 40 reach the other end of the module 13, the limit switch 50 will trip and cause the motor 31 to reverse, whereupon the heads 39 and 40 will move together in the opposite direction to the point of beginning, the return trip also taking approximately one minute in the preferred embodiment. At the conclusion of this cycle, if the switch 75 is still sensing a pressure differential indicating clogging, the cycle will be repeated, and this will continue until the filter 13 is sufficiently clean.

The diverter valve 74 is switched in response to the rotary limit switch 50, so that one of the nozzles 67 is operative as the heads travel in one direction, and the other nozzle is operative during the return trip. It has been found that using suction for only one-half the width of the filter in this manner provides an effective cleaning action and allows the use of a substantially smaller suction device.

The entire cleaning operation is carried on while the bench is in operation, so no down time is required. The cleaning action is extremely effective, and there is little or no chance of physical damage to the filter medium. Effectiveness is maintained despite the fact that the blower and suction device are relatively small. It is estimated that using a suction device alone would require a device with at least twice the capacity, and the cost of such a device would be substantially more than twice the cost of the suction device 73. Using a blower device alone would also require at least doubling the capacity of the blower 71, and even then it is unlikely that there would be effective cleaning because of the tendency for a blower to simply scatter or move particles from one place to another in the relatively deep and narrow pleats. The combined blower-suction operation is particularly suitable for a pleated filter of the type shown, but would be applicable to other filters as well.

Although a preferred embodiment of the invention has been shown and described, it will be obvious that variations might be made without departure from the spirit of the invention. The invention is not, therefore, intended to be limited by the showing or description herein, or in any other manner, except insofar as may specifically be required.

We claim:

1. For a filter comprising a lengthwise series of transverse pleats and disposed in a housing to divide the housing into an inlet dust chamber and an outlet clean air chamber, a cleaning arrangement comprising: a blower; a blower head that is disposed in the outlet clean air chamber, said blower head defining a substantially continuous blower slot that faces and extends substantially entirely across the filter parallel to the pleats and that has a width substantially equal to the width of one pleat; a single suction source; a suction head disposed in the inlet dust chamber, said suction head defining a pair of axially aligned suction slots that face and together extend substantially entirely across the filter, and that are parallel to and in alignment with the blower slot, each suction slot extending substantially halfway across the filter and having a width substantially equal to the width of one pleat; means to move the blower and suction heads back and forth in tandem along the length of the filter; means to connect the blower to the blower slot so that the blower slot is operative as the heads move in both directions; and means to alternately connect the separate suction slots to the suction source so that one suction slot is operative when the heads move in one direction and the other suction slot is operative when the heads move in the other direction.

* * * * *